United States Patent Office 3,350,552
Patented Oct. 31, 1967

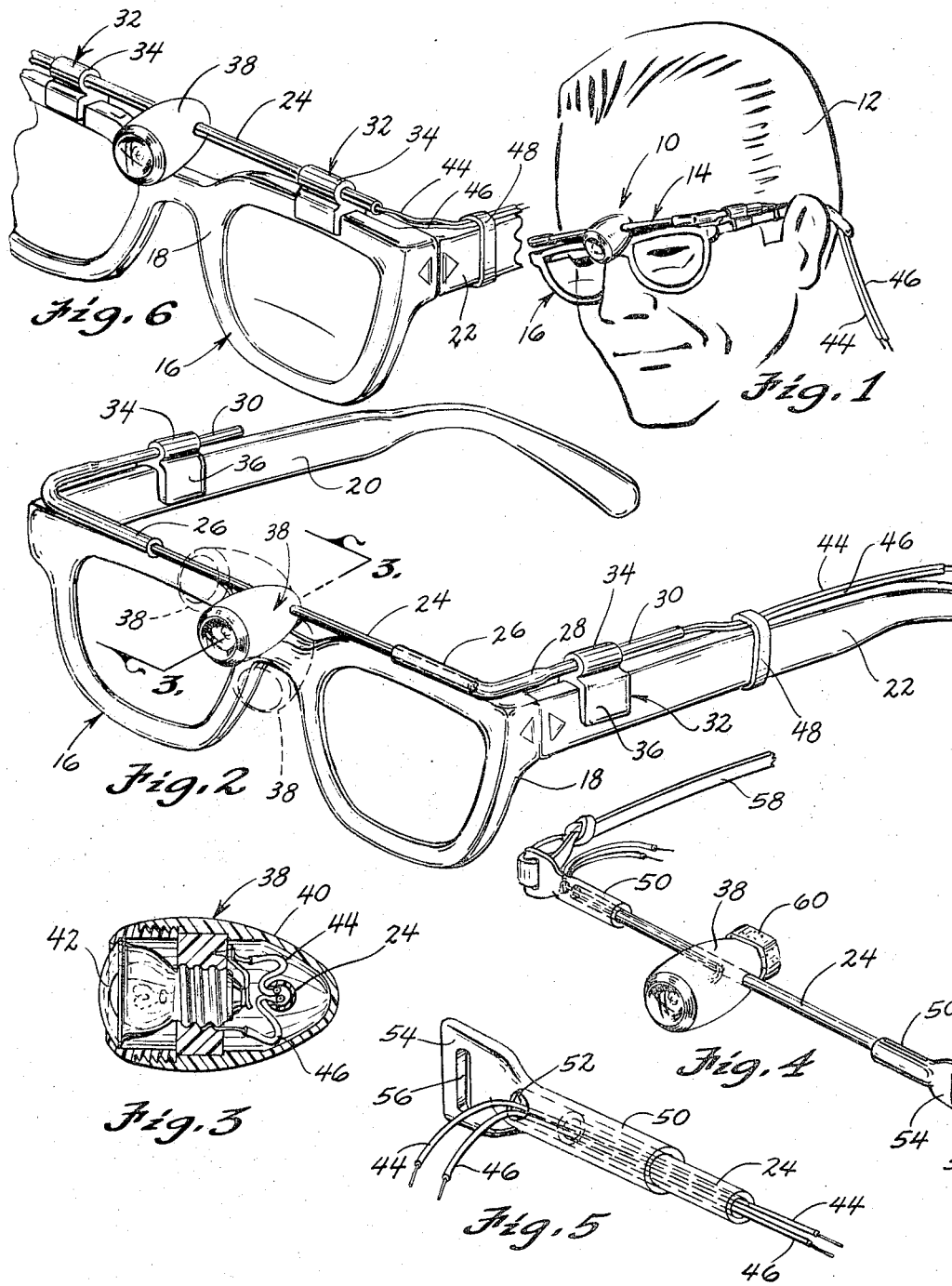

3,350,552
ILLUMINATING DEVICE FOR A
PERSON'S HEAD
Paul A. Lawrence, 1660 Beaver,
Des Moines, Iowa 50310
Filed Mar. 5, 1965, Ser. No. 437,514
8 Claims. (Cl. 240—2)

This invention relates to an illuminating means and in particular to a light means which may be detachably fitted to a person's head.

The light of this invention may be used by electricians in basements, attics, closets; plumbers working under sinks and in basements; television men; jewelry and watch repair shops; servicemen at night; meter readers in basements; bookkeepers; mechanics; all types of night deliverers making out orders; doctors; people desiring to read or write on trains, automobiles, airplanes or in dimly lit homes; and bedfast or wheelchair patients. These are only a few uses for this invention and there are obviously many others.

A particular disadvantage of lights heretofore available for these uses is that they are customized for the individual wearers and therefore a single light unit will only serve one person. A pair of eyeglasses is analagous to this in that they are not interchangeable.

Therefore, one of the objects of this invention is to provide a light unit which may be readily adjusted to fit any person.

Another object of this invention is to provide a light unit which is adjustable and may be detachably secured to all eyeglass frames.

A still further object of this invention is to provide a light unit which may be readily adjusted to focus the light as desired.

Another related object of this invention is to provide a light unit which includes a light mounted on an elongated element which may be detachably secured to the front frame of a pair of eyeglasses or, if desired, to the temple members of the eyeglass frames.

A still further object of this invention is to provide a light unit which is mounted on an elongated element and may be connected to a flexible element which is fitted to a person's head.

A still further related object of this invention is to provide a light unit mounted on an elongated hollow element which encloses the electrical wires.

Another related object of this invention is to provide a light unit for mounting on a person's head wherein the power supply for the light is stationed at a remote point from the light means per se such as in the case of a man, in his pocket or in the case of a woman in her handbag.

A still further related object of this invention is to provide a light means having a universal clip which is suitable for mounting the light means to the front frame of the eyeglasses or the like or to the temple members.

Another important object of this invention is to provide a light means mounted on an elongated element having telescopic end portions which may be readily adjusted to vary the effective length of the elongated element to fit eyeglasses having different widths.

A further object of this invention is to provide an illuminating device for a person's head which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a perspective view of the light unit in use fitted to a person's eyeglasses;

FIG. 2 is an enlarged perspective view of the light assembly mounted on a pair of eyeglasses with detachable fasteners engaging the temple members of the eyeglass frames and further showing the light means in various positions of use;

FIG. 3 is a cross-sectional view taken along line 3—3 in FIG. 2;

FIG. 4 is an alternate embodiment of the light assembly for people who do not wear eyeglasses or the like;

FIG. 5 is an enlarged fragmentary view of the telescoping end portion used with the embodiment of FIG. 4; and FIG. 6 is a fragmentary perspective view of a third embodiment of this invention wherein the light assembly is detachably secured to the front frame portion of a pair of eyeglasses.

An embodiment of this invention is shown in FIG. 1 generally referred to by the reference numeral 10 and fitted on a person's head 12. The embodiment of this invention in FIGS. 1, 2, and 3 includes the combination of a light assembly 14 and a pair of eyeglasses 16 of conventional design. The glasses 16 include a front frame portion 18 with rearwardly extending temple members 20 and 22.

The light assembly 14 includes an elongated hollow tube 24 which telescopically engages a pair of end elements 26 which have portions 28 extending at 90 degrees to the longitudinal axis of the elongated element 24. The portions 28 are thus shaped to extend along the temple members 22. The outer ends 30 of the portions 28 are reduced in diameter to correspond to the diameter of the elongated element 24. Fastener element 32 having a sleeve portion 34 embracing the outer end 30 of the return portion 28 also has a pair of clamp portions 36 for yieldably gripping the temple members 20 and 22.

A light unit 38 having a casing 40 is pivotally mounted on the elongated element 24 and includes a conventional light bulb 42 connected to a pair of electrical leads 44 and 46. The electrical leads 44 and 46 extend from the casing 40 into the hollow element 24 and then into the L-shaped telescopic end member 26 and out the rear end thereof along the temple member 22. An elastic band 48 is employed to hold the leads wires 44 and 46 against the temple member 22.

Since the light assembly 14 is constructed of plastic material, an excellent frictional fit may be obtained between the elongated element 24 and the telescopic members 26 and additionally between the sleeve portion 34 and the outer end portions 30 of the L-shaped members 26. Thus, the light unit 38 may either pivot against the frictional action of the elongated element 24 against the opening in the casing 40 to the dash line positions 38 in FIG. 2 or the entire light unit 38 and the elongated element 24 may pivot relative to the end members 26 to the several positions of FIG. 2. Moreover, it is readily seen that regardless of the length of the front frame of the glasses 16, the light assembly 14 may be adjusted such that the L-shaped end members 26 will fit over the temple members 22 to be clamped in place by the plastic or rubber clamp elements 32.

A power supply such as a battery (not shown) may be located in the pocket of a man using the light assembly or in the case of a woman in her handbag. Obviously, other sources of electrical power may be employed and a switch (not shown) may be conveniently located in the electrical leads 44 and 46 as desired.

It is thus seen that a very neat appearing light assembly is provided for use on glass frames or the like and that the light assembly may be easily adjusted to fit any size frame and is thereby not restricted to one particular pair of glasses. Moreover, the light unit 38 may be pivoted as desired to focus the light as required.

In FIG. 6, a varient of the light assembly of FIGS. 1, 2 and 3 is shown and like elements are referred to by similar reference numerals. Thus, the light unit 38 is mounted on the hollow elongated element 24 and the electrical lead wires 44 and 46 extend outwardly from one end of the element 24. An elastic band or the like 48 holds the wires in position on the temple member 22. This embodiment, is simplified since the fastener 32 is positioned directly onto the top portion of the front frame 18 and the sleeve portions 34 of the fastener 32 telescopically engage the ends of the elongated element 24. Thus, the L-shaped end members 26 are eliminated. Since the diameter of the outer end portions 30 of the L-shaped member 26 in FIG. 2 is the same as the diameter of the elongated element 24, the sleeve portion 34 is capable of giving a friction fit against the outer surface of the element 24 to resist accidental rotation of the element 24 in the sleeves 34. However, the light unit 38 may be pivoted as illustrated in FIG. 2 and additionally, the elongated element 24 may if desired be rotated within the sleeve portions 34.

A third embodiment of this invention is shown in FIGS. 4 and 5 and also employs the elongated element 24 and the light unit 38. In this embodiment a pair of end sleeve members 59 are provided telescopically engaging the ends of the elongated element 24. The electrical lead wires 44 and 46 as shown in FIG. 5 extend from the hollow element 24 into the sleeve portion 50 and outwardly through an opening 52. An eye portion 54 is formed on the outer end of the sleeve 50 and is provided with an elongated slot 56 to receive the ends of a flexible band 58 which is adapted to extend around the wearer's head. It is apparent that as in the case of the embodiments of FIGS. 1, 2 and 3 and FIG. 6, that the length of the light assembly may be varied along the longitudinal axis of the element 24 by moving the sleeve portions 50 to the appropriate position. A piece of resilient material 60 is placed on the rear end of the light unit 38 and is adapted to bear against the wearer's forehead.

Thus it is seen that common to all of the three embodiments is the light unit 38 which is pivotally mounted on an elongated hollow element 24 and that depending on the desire of the user this combination may be used with the appropriate components of any of the three embodiments.

Some changes may be made in the construction and arrangement of my illuminating device for a person's head without departing from the real spirit and purpose of my invention, and it is my intention to cover by my claims, any modified forms of structure or use of mechanical equivalents which may be reasonably included within their scope.

I claim:

1. In combination,
   an eyeglass frame having a front frame and a pair of spaced rearwardly extending temple members,
   an elongated element, said elongated element extending along the front frame of said eyeglasses,
   a light means mounted on said elongated element,
   end elements telescopically secured to the ends of said elongated element, said end elements having portions extending at substantially right angles to the longitudinal axis of said elongated element and extending along said temples, and
   fastener means detachably securing said end elements to said temples.

2. In combination,
   an eyeglass frame having a front frame and a pair of spaced rearwardly extending temple members,
   an elongated hollow element, said elongated element extending along the front frame of said eyeglasses,
   a light means mounted on said elongated element,
   hollow end elements telescopically secured to the ends of said elongated element, said end elements having portions extending at substantially right angles to the longitudinal axis of said elongated element and extending along said temples,
   fastener means detachably securing said end elements to said temples, and
   electrical lead wires extending from said light means into said hollow elongated element and into said hollow end elements.

3. A light assembly for eyeglasses having a front frame and a pair of temple members, comprising,
   an elongated element, said elongated element adapted to extend along the front frame of said eyeglasses,
   a light means mounted on said elongated element,
   end elements telescopically secured to the ends of said elongated element, said end elements having portions extending at substantially right angles to the longitudinal axis of said elongated element and adapted to extend along said temples, and
   fastener means for detachably securing said end elements to said temples, said fastener means having a sleeve portion embracing said right angle portions, and a pair of finger portions adapted to releasably clamp said temple members.

4. A light assembly for mounting on a person's head, comprising,
   an elongated hollow tubular element,
   a light means pivotally mounted intermediate the ends of said elongated tubular element,
   electrical lead wires extending from said light means into said hollow tubular element, and
   securing means having a sleeve detachably telescopically connected to opposite ends of said elongated tubular element, said securing means including a head element connected to each of said sleeves and adapted to be fitted to a person's head.

5. The structure of claim 4 wherein said head element is defined as an eyeglass type frame.

6. The structure of claim 4 and means connected to the outer free ends of said sleeves and adapted to extend around a person's head, and said lead wires extending through one of said sleeves.

7. The structure of claim 6 wherein said light means has a housing and cushion means is secured to the rear side of said light means housing and is adapted to bear against a person's head when in use.

8. In combination,
   an eyeglass frame having a front frame and a pair of spaced apart rearwardly extending temple members,
   an elongated element,
   a light means pivotally mounted on said elongated element,
   end elements telescopically engaging the opposite ends of said elongated element, said end elements being selectively adjustable inwardly and outwardly on said elongated element,
   said end elements including portions extending at right angles to the longitudinal axis of said elongated element, and fastener means on said portions detachably securing said portions to the temples of said eyeglass frame.

References Cited

UNITED STATES PATENTS

| | | | |
|---|---|---|---|
| 1,615,067 | 1/1927 | Boerman | 240—2 |
| 2,783,367 | 2/1957 | Locke | 240—52.1 |
| 2,794,908 | 6/1957 | Evans | 240—59 |
| 3,069,538 | 12/1962 | Hobson | 240—59 |

FOREIGN PATENTS 153,036   4/1938   Austria.

NORTON ANSHER, *Primary Examiner.*